United States Patent [19]
Kaplan

[11] 3,726,176
[45] Apr. 10, 1973

[54] APPARATUS FOR THE INSTRUCTION OF HAND ANGULATION IN PLANING STRINGED INSTRUMENTS

[76] Inventor: Burton Kaplan, 817 West End Avenue, New York, N.Y. 10025

[22] Filed: Oct. 28, 1971

[21] Appl. No.: 193,364

[52] U.S. Cl. ..........................84/470, 84/281, 84/465
[51] Int. Cl. .............................................G09b 15/00
[58] Field of Search....................................
  84/281–283, 328, 453, 465, 467–470, 477;
  200/DIG. 2, 61.47

[56] References Cited

UNITED STATES PATENTS 1,343,595   6/1920   Tiffany.................................84/469
2,240,696   5/1941   Gusman ..............................84/281

FOREIGN PATENTS OR APPLICATIONS 101,141   1/1899   Germany..............................84/465

Primary Examiner—Richard B. Wilkinson
Assistant Examiner—John F. Gonzales
Attorney—Elmer R. Helferich et al.

[57]   ABSTRACT

A hand angulation sensor is secured to the body of a student and an indicator responsive to the sensor provides indication to the student of each departure of his string-fingering hand from desired angulation during play.

8 Claims, 5 Drawing Figures

PATENTED APR 10 1973 3,726,176

APPARATUS FOR THE INSTRUCTION OF HAND ANGULATION IN PLAYING STRINGED INSTRUMENTS

FIELD OF THE INVENTION

This invention pertains to music education and more particularly to methods and apparatus for instructing students in the art of playing stringed instruments.

BACKGROUND OF THE INVENTION

A common initial fault of students of the stringed instruments, particularly of the violin, is improper angulation of the string-fingering hand relative to the wrist and forearm. Ideally, this hand is disposed in alignment with the forearm and wrist. While some variation from such ideal position is tolerable, e.g., movement such that the back of the hand is inclined somewhat inwardly of the wrist and forearm, variation in hand angulation outwardly from such ideal position greatly reduces the student's efficiency in string fingering and otherwise hampers his mobility and his accuracy in intonation. While the student, whether beginning or remedial, readily positions his hand initially in such desired manner, he characteristically permits his hand to depart from proper angulation during playing. By the term playing, I include private practice, concert, rehearsal or practice at a lesson.

Oral instructional efforts customarily undertaken to influence the student in the continuation of proper hand angulation during his playing of the instrument are less effective than is desired, and are effective to such extent only during practice at a lesson. Whereas deficiencies in tonal reproduction and intonation may indicate improper hand angulation to the skilled artist, such deficiencies do not so inform the beginning student and, accordingly, are not a source of corrective influence.

Violin instructional devices in the nature of harnesses effective to constrain a student to desired positions as shown, e.g., in U.S. Pat. Nos. 1,906,584 and 2,240,696, are not seen as providing any such corrective influence. These devices are effectively crutches providing unnatural assistance not likely to continue their limited effectiveness when dispensed with. Furthermore, during use thereof, these devices prevent experimentation by the student, thereby eliminating the possibility of error on his part. Evidently, these devices cannot assist the student in developing a sense of guidance independent of the devices.

SUMMARY OF THE INVENTION

I have observed that the attention of the stringed instrument student is diluted by the variables he is required to control to such an extent that the attention he in fact directs to any particular variable, e.g., hand angulation, is inadequate. Accordingly, I have concluded that instructional method and apparatus likely to provide improved corrective influence must have the effect of focusing the attention of the student on distinct variables and develop in him an independent sense of guidance. Such method and apparatus are the primary objects of this invention.

It is an additional object of this invention to provide instructional method and apparatus for use in private practice independently of an instructor.

A further object of the invention is to provide instructional apparatus which interferes minimally with the freedom of movement of the student.

In the attainment of the foregoing and other objects, the invention provides apparatus, including hand angulation-sensitive signal generating means secured to the student, effective on predetermined deviation from proper angulation of the string-fingering hand to direct the student's attention to this variable. In accordance with the method of the invention, such apparatus is provided and secured to the student.

The foregoing and other objects and features of the invention will be evident from the following detailed description thereof and from the drawings.

DETAILED DESCRIPTION OF THE PREFERRED EMBODIMENTS

Figure 1:
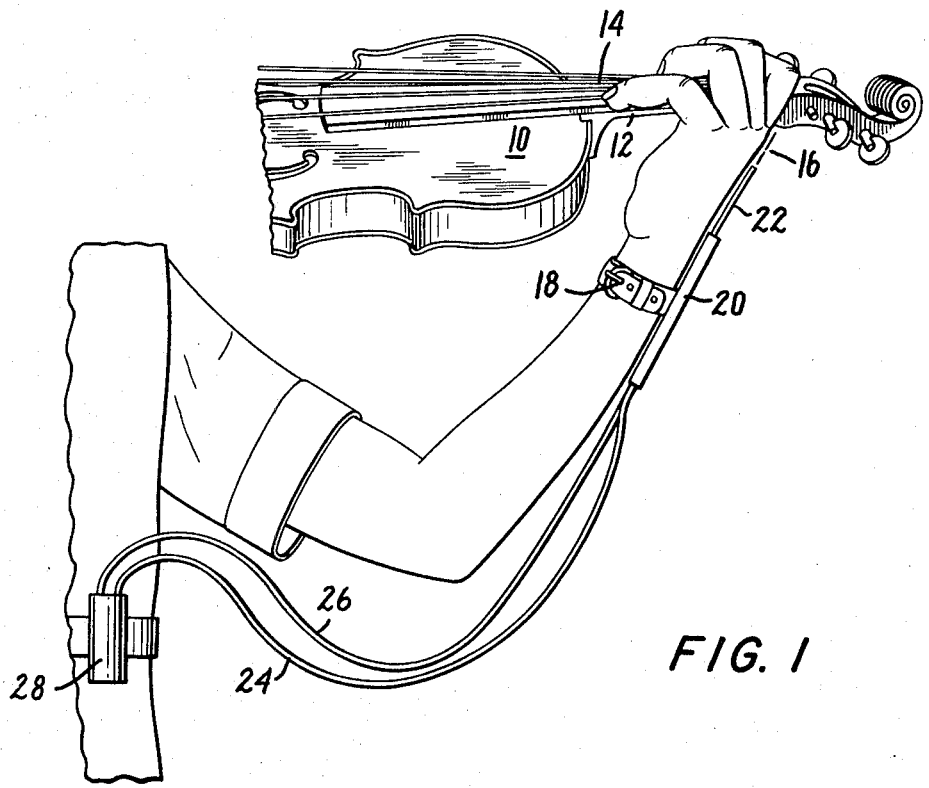
FIG. 1 is a perspective view instructive of the method of the invention and illustrating apparatus for practice thereof.

In FIG. 1, neck 12 of violin 10 rests in the left hand of a student. The student's hand is disposed in a substantially straight line with his forearm and wrist to maximize his capabilities of fingering violin strings 14. Line 16 defines a position outwardly of which hand angulation is undesired.

Secured to the student's forearm, as by strap 18, is an elongate casing 20 which conforms generally in orientation with line 16. Extending exteriorly of casing 20 is an elongate actuator member 22 supported by the casing to coincide with line 16. Insulated conductors 24 and 26 extend from casing 20 to a remotely disposed assembly 28, which may conveniently be secured to the student's belt. In such arrangement, conductors 24 and 26 are of sufficient length so as not to interfere with movement of the arm of the student.

Figure 2:
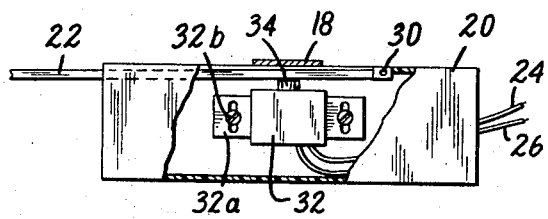
FIG. 2 is an elevational view of the apparatus of FIG. 1 broken away in part to show detail.

Referring to FIG. 2, casing 20 supports member 22 therewithin for pivotal movement about pin 30 and further supports a switch 32 in fixed position. Switch push-button 34 provides further support for member 22 as shown, the weight of member 22 being selected such that the member may be supported by push-button 34 without operating the switch. These elements are arranged in the casing such that member 22 is inclined downwardly of the casing upper wall whereby it may coincide with line 16.

In order to provide for some variation in defining the range of proper hand angulation, which may differ somewhat from teacher to teacher, the apparatus of FIG. 2 provides for modification in the inclination of member 22 relative to casing 20. Thus, switch 32 may include mounting flanges including slots 32*a* cooperative with screws 32*b* to dispose push-button 34 in desired position for supporting member 22.

Figure 3:
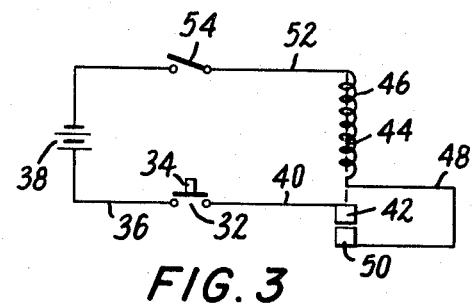
FIG. 3 is a schematic diagram of a circuit for use in the apparatus of FIGS. 1 and 2.

First extremities of conductors 24 and 26 are connected to the terminals of switch 32 and, as shown in FIG. 3, the other extremities are connected, in assembly 28, respectively by line 36 to one terminal of a battery 38 and by line 40 to contact member 42.

Contact member 42 is resiliently supported in assembly 28 for movement by the armature 44 of coil 46. One terminal of the coil is connected by line 48 to contact member 50, fixedly supported in assembly 28 in position engaging contact member 42 when coil 46 is unenergized. The remaining terminal of the coil is connected by line 52 to the remaining terminal of battery 38. The circuit of FIG. 3 will be recognized as a conventional buzzer type annunciator in association with switch 32. In operation thereof, when the contacts of switch 32 are bridged by the contact arm of push-button 34, which takes place on depression of the push-button by actuator member 22, coil 46 is energized by battery 38 and thereupon displaces armature 44 such that contact member 42 is removed from contact member 50 with consequent deenergization of the coil. As the contact members are thereupon re-engaged, the coil is re-energized. This activity is cyclic throughout periods of closure of switch 32 and gives rise to sustained audible output. Where desired, a switch 54 may be introduced in the circuit of FIG. 3 so as to provide for the disabling of the buzzer at the option of the student or teacher. Casing 20 or assembly 28 may contain such switch and provide a convenient exterior actuator therefor.

Actuator member 22 is preferably comprised of flexible material, e.g., spring steel, throughout the expanse thereof contacted by the student's hand on improper angulation. By this provision, physical sensation as between such actuator member and the student's hand is minimized and the student's attention is focused by the indication provided by the accessory apparatus.

The methods of the invention, whereby the attention priorities of the student are conformed to the interests of the teacher, involve the steps of providing the accessory apparatus and securing the same to the student. Preferably, the method is practiced by providing the apparatus, determining the proper angulation of the string-fingering hand for a given student, and equipping the student with the accessory apparatus in such manner as to insure that an indication is provided to the student on each occurrence of his improper hand angulation. Evidently, a limited range of proper hand angulation exists and may vary somewhat from teacher to teacher. As discussed above, the variable positioning support elements in casing 20 readily accommodate the adjustment of the orientation of actuator member 22 relative to the student's hand to define such range.

In the use of the apparatus and method of the invention, it has been observed that the average student is instructed as respects his proper hand angulation in relatively short order and thereafter plays without energizing the accessory apparatus, despite that the same is active and prepared to provide indications of deviation from proper hand angulation. It has been observed further that on the removal of the accessory apparatus after limited use thereof, the student has developed a mature habit of consistently maintaining proper hand angulation, evidence of his development of an independent sense of guidance.

Figure 4:
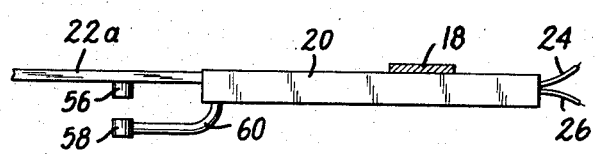
FIGS. 4 and 5 are elevational views of alternate embodiments of apparatus for practicing the invention.

Referring to FIG. 4, elongate flexible actuator member 22a is supported in casing 20 and carries a contact element 56 connected to conductor 24. A second contact element 58 connected to conductor 26 is supported on element 60 which is in turn fixedly secured to casing 20. The casing is positioned on the student's arm by strap 18 such that actuator element 22a is displaced toward element 60 for engagement of contacts 56 and 58 on each deviation from proper hand angulation.

Figure 5:
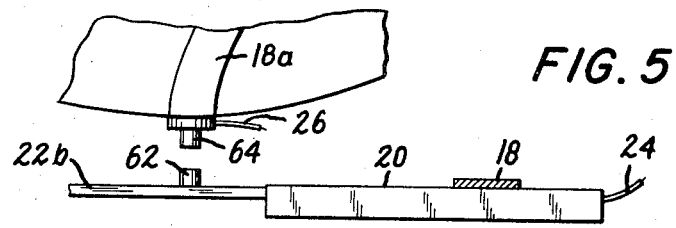

In FIG. 5, member 22b is supported in casing 20 and carries a contact 62 connected to conductor 24. A second contact 64 connected to conductor 26, is secured to strap 18a and is thus supported on the back of the student's string-fingering hand. Contacts 62 and 64 have sufficient expanse to engage on deviation from proper hand angulation when accompanied by transverse hand movement. In a still further arrangement of apparatus for practicing the invention, the requisite two spaced contacts may be supported on the student's hand and actuated by a fixed member secured to his forearm along line 16. It is within the contemplation of the invention to provide a student with information respecting any undesired angulation of his string-fingering hand. Thus, the method and apparatus of the invention may be readily applied to such transverse hand movement, i.e., tilting in the plane of the wrist and forearm, independently of hand angulation, i.e., tilting out of the plane of the wrist and forearm.

While the apparatus and method of the invention have been described by way of particularly preferred embodiments thereof, numerous changes in the described apparatus will be readily evident to those skilled in the art. Thus, for example, piezoelectric or like annunciators may be employed in place of the illustrated electromechanical buzzer. It is also within the contemplation of the invention to combine the elements of casing 20 and assembly 28 in a unitary housing which may itself be secured to the student's forearm, thus eliminating the presence of conductors depending from the forearm. Assembly 28 may also be secured to the stringed instrument itself. The embodiments particularly disclosed are thus intended in a descriptive and not in a limiting sense. The true spirit and scope of the invention is defined in the following claims.

What is claimed is:

1. Apparatus for use in instructing a student in properly angulating the hand employed in fingering the strings of a stringed instrument comprising:
   a. a switch;
   b. an actuator for said switch;
   c. means securable to the body of the student for supporting said switch in actuatable position relative to said actuator and for supporting said actuator in predetermined position relative to the string-fingering hand of the student;
   d. a voltage source; and
   e. indicator means connected to said source by said switch, said indicator means being energized upon operation of said switch by said actuator.

2. The apparatus claimed in claim 1 wherein said indicator means comprises an electromechanical buzzer.

3. The apparatus claimed in claim 1 wherein said securable means comprises an elongate casing containing said switch and having a support member affixed to said casing for securing said casing to the forearm of the student, said switch actuator comprising an elongate member extending exteriorly of said casing, said casing providing pivotal support for said elongate member.

4. A method for teaching a student of a stringed instrument to maintain predetermined angulation between his forearm and his hand employed in string-fingering during the playing of the instrument including the step of equipping the student with apparatus both permitting him to change the angulation between said forearm and hand and providing him with an indication upon each occurrence of forearm-hand angulation having preselected relation to said predetermined angulation.

5. The method claimed in claim 4 wherein said equipping step is practiced by using apparatus providing an audible indication on each said occurrence.

6. A method for teaching a student of a stringed instrument to maintain proper angulation between his forearm and his hand employed in string-fingering, comprising the steps of:

a. determining a range of proper forearm-hand angulation for the student;

b. providing an assembly including a voltage source, indicator means and means connected to said source and to said indicator means for detecting forearm-hand angulation having preselected relation to said proper angulation range and thereupon connecting said indicator means to said voltage source; and c. securing said assembly to the body of the student.

7. The method claimed in claim 6 wherein said assembly providing step is practiced by using detecting means including a switch, a switch actuator and means supporting said switch in actuatable position relative to said actuator and supporting said actuator in preselected position relative to the string-fingering hand of the student.

8. The method claimed in claim 7 wherein said securing step is practiced by securing said detecting means to the forearm of the student.

* * * * *